Figure 1:
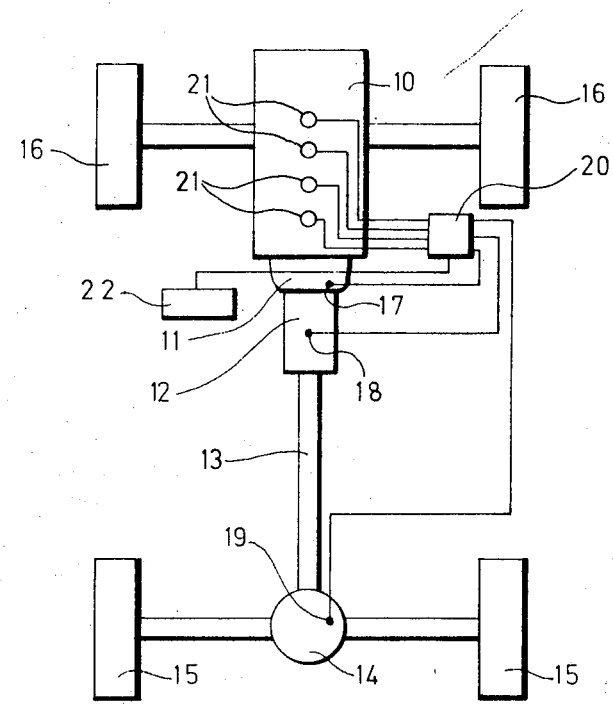

United States Patent [19]
Pagdin

[11] 3,851,723
[45] Dec. 3, 1974

[54] TRANSMISSION OVERHEATING ENGINE SHUTDOWN CONTROL FOR SELF PROPELLED VEHICLES

[75] Inventor: Brian Colin Pagdin, Sutton Coldfield, England

[73] Assignee: GKN Transmissions Limited, Birmingham, England

[22] Filed: Feb. 15, 1973

[21] Appl. No.: 332,766

[30] Foreign Application Priority Data
Feb. 15, 1972 Great Britain...................... 6856/72

[52] U.S. Cl. .............................................. 180/103
[51] Int. Cl. ........................................... B60k 21/06
[58] Field of Search ......... 74/859; 180/103; 73/346, 73/347; 307/9, 10 R, 117

[56] References Cited
UNITED STATES PATENTS

| | | |
|---|---|---|
| 1,478,084 | 12/1923 | Whittington.......,.................. 73/346 |
| 1,542,096 | 6/1925 | Riblet............................... 73/346 X |
| 1,621,396 | 3/1927 | Collins................................. 73/346 |
| 1,667,027 | 4/1928 | Boyce .................................. 73/346 |
| 1,721,617 | 7/1929 | Durant............................. 73/346 X |
| 2,231,845 | 2/1941 | Curran............................. 73/346 X |
| 2,509,400 | 5/1950 | Roswell............................... 180/103 |
| 3,656,101 | 4/1972 | Akeley.......................... 180/103 X |
| 3,659,113 | 4/1972 | Wagner.......................... 180/103 X |

*Primary Examiner*—David Schonberg
*Assistant Examiner*—Terrance L. Siemens
*Attorney, Agent, or Firm*—Spencer & Kaye

[57] ABSTRACT

The specification discloses a vehicle in which a prime mover is connected to driven wheels through a transmission element such as a change speed gear box, a transfer gear box, a driven axle or a torque converter. Sensor means are provided to sense the temperature of the or each transmission element and to prevent operation of the prime mover if the temperature attained by the transmission element exceeds a predetermined value.

2 Claims, 2 Drawing Figures

PATENTED DEC 3 1974  3,851,723

TRANSMISSION OVERHEATING ENGINE SHUTDOWN CONTROL FOR SELF PROPELLED VEHICLES

This invention relates to self-propelled vehicles of the type, hereinafter referred to as being of the type specified, which includes a prime mover, driven wheels and one or more transmission elements between the prime mover and the driven wheels to transmit drive between the prime mover and the driven wheels, the or at least one of the transmission elements including a casing with parts rotating therein. Examples of such transmission elements are change speed gear boxes, transfer gear boxes, driven axles and torque convertors.

One of the problems encountered in vehicles of the type specified arises due to the generation of heat in a transmission element and which, if excessive and uncontrolled, can for example cause seizure of parts of the transmission element, distortion of the parts greater than that allowed for in the design, or failure of oil or similar fluid seals.

It is an object of the present invention to provide a vehicle of the type specified in which permanent damage of a transmission element due to the generation of heat therein is avoided.

According to the invention we provide a vehicle of the type specified including sensor means to sense the temperature of the or a transmission element and control means which prevents further operation of the prime mover when said temperature attains a predetermined value.

By a suitable choice of temperature the prime mover can be cut out before any permanent damage is done to the transmission element.

The temperature of the transmission element may be sensed directly, e.g., by a temperature-sensitive element in contact with a part of the transmission element or fluid contained therein, or may be sensed indirectly by, for example, sensing the temperature within an enclosure surrounding, but spaced from, the transmission element.

The control means are preferably arranged so that said further operation of the prime mover is prevented upon attainment of said predetermined temperature until the transmission element has cooled to a lower predetermined temperature, the first temperature being hereinafter referred to as the higher predetermined temperature.

Further operation of the prime mover may, if a petrol engine, be effected by interrupting the ignition or fuel supply and, if a diesel engine, by interrupting the fuel supply. If the prime mover is an electric motor then the supply thereto will be interrupted.

The sensor may be of any convenient type, e.g. a bi-metallic element which may form part of a switch, a vapour change element, a wax capsule switch or a thermocouple. If it is desired to sense the temperature of a part of the transmission element which is rotating within a casing then the appropriate signal may be led out of the casing by a slip-ring device, as the temperature within the casing can be sensed.

Where the sensor is in the form of a bimetallic element the latter may, for example, form a wall or part of a wall, of a casing for the transmission element, the wall or part deflecting when the said higher predetermined temperature is attained thus operating the control means to cut out the prime mover.

The attainment of said higher predetermined temperature may be indicated by the operation of a warning device, e.g. an audible or visible warning device so that the driver is aware, when the engine cuts out, that this is due to the overheating of a transmission element.

Figure 2:
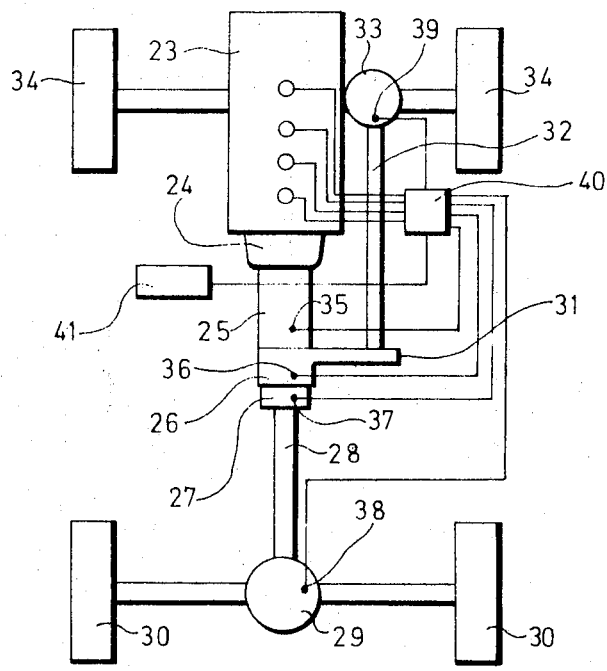

The invention will now be described in detail by way of example with reference to the accompanying diagrammatic drawings in which:

FIG. 1 is a diagram showing the invention applied to a conventional two-wheel drive vehicle; and FIG. 2 is a similar view showing the invention applied to a four-wheel drive vehicle.

Referring now to FIG. 1, the vehicle there shown has a prime mover 10 in the form of a petrol engine. The prime mover is connected, via a torque converter 11 to a change speed gear box 12. A propeller shaft 13 connects the output of the change speed gear box to a differential gear 14 which is interposed between rear driven wheels 15. The front wheels of the vehicle are indicated at 16 and are not driven.

Temperature sensitive elements are located to sense the temperature of the torque converter 11, the change speed gear box 12 and the differential gearing 14. These temperature sensitive elements are indicated at 17, 18 and 19 respectively.

The temperature sensitive elements 17, 18 and 19 are connected to control means 20 which incorporates the ignition system of the prime mover and is connected to the sparking plugs 21 of the prime mover. A warning device 22 which may be of audible or visual type is connected to the control means 20.

The temperature sensitive elements 17, 18 and 19 may be of any convenient type as described above. They are each set so that at a predetermined temperature a signal will be sent to the control means 20 which will have the affect of interrupting the ignition circuit of the prime mover 10 thus preventing further operation thereof. Simultaneously the warning device 22 will be operated so as to warn the driver that the non-operation of the prime mover is due to a signal having been sent from one of the transmission elements indicating that the transmission element has over heated.

The temperature sensitive elements 17, 18 and 19 will be so arranged as to prevent the operation of the prime mover 10 until the transmission elements with which they are associated have cooled down to a lower predetermined temperature.

It will be seen, therefore, that if any one of the transmission elements over heat the further operation of the prime mover will be prevented and serious damage to the transmission element will be avoided. The operation of the warning device 22 tells the driver what has happened so that he does not start looking for some fault in the prime mover itself.

The invention is particularly useful in connection with four wheel drive vehicles where one has an inter-axle differential gear which splits the torque between the front and rear axles and which is controlled by a viscous shear coupling or clutch. Such a vehicle is indicated diagramatically in FIG. 2.

Referring to this figure, there is a prime mover 23, a disengageable clutch 24 and a change speed gear box 25 whose input is connected to the prime mover via the clutch 24. The output of the change speed gear box is connected to an inter-axle differential 26 and the latter is associated with a viscous shear coupling 27. A propeller shaft 28 extends from the inter-axle differential 26 to the rear axle differential 29 which drives the rear wheels 30. A transfer casing 31 is connected to the inter-axle differential gear and drives, via the propeller shaft 32, a differential 33 connected to the front wheels 34.

Temperature sensitive elements are provided in the change speed gear box 25, the inter-axle differential 26, the viscous shear coupling 27, the rear differential 29 and the front differential 33. The temperature sensitive elements are indicated at 35, 36, 37, 38 and 39 respectively. They are all connected to control means 40 which in turn is connected in the ignition circuit of the prime mover. Also connected to the control means 40 is a warning device 41.

As explained with reference to FIG. 1, should any of the temperature sensitive elements 35 to 39 respectively register a temperature above a predetermined temperature then a signal is sent to the control means 40 which prevents further operation of the prime mover until the temperature of the transmission element concerned has fallen to a lower predetermined temperature all as described above.

The vehicle is arranged so that one of the sets of driven wheels, normally the rear wheels 30, will be dominant and during normal operation of the vehicle a major part of the torque from the engine will be fed to the rear wheel. When a situation arises in which there is a speed difference greater than a predetermined difference between the front and rear wheels then a part of the torque previously supplied to the rear wheels 30 will be re-routed to the front wheels 34 by means of the inter-axle differential gear 26 as controlled by the viscous shear coupling 27.

The most likely item to suffer from over heating is the viscous shear coupling 27. Thus if the vehicle is in a situation in which there is insufficient torque available to move it the viscous shear coupling may over heat. Thus if the vehicle has its back wheels, for example, in a ditch and its front wheels out of the ditch there may be insufficient torque available from the prime mover 23 to pull the vehicle out of the ditch even when all the torque is applied to the front wheels 34. In such circumstances, if the driver persists in trying to extract the vehicle, a considerable amount of heat will be generated in the viscous shear coupling 27 and in the inter-axle differential gear 26 and in the absence of any control such as is provided by this invention permanent damage could be suffered, particularly by the viscous shear coupling, due to failure of the seals under heat.

It is considered particularly important, therefore, that in a four wheel drive vehicle having an inter-axle differential and a control for the differential, be it a viscous shear coupling as described or a clutch, there shall be a temperature sensitive element associated with the torque splitting arrangement between the axles so as to prevent further operation of the prime mover in the event that over heating occurs. It will be appreciated that in both of the examples described above the transmission element will consist of casings with members rotating therein in a fluid, either a viscous fluid or lubricating oil. The temperature sensitive element can either be arranged to sense the temperature of the fluid or the temperature of the casing. The various arrangements for the temperature sensitive element may be as described above. Thus in particular a wall or part of a wall, of one of the casings may be formed as a bimetallic element which distorts at a predetermined temperature to send a signal to the control means 20 or 40 to prevent further operation of the prime mover.

The invention has been described specifically in relation to the prevention of further operation of the prime mover by interrupting the ignition circuit, the prime mover in each case being a petrol engine. Equally, the control could be effected by interrupting the fuel supply by, for example, interrupting the power supply to a fuel pump if this is electrically operated or by opening a by-pass in the fuel line if the petrol pump is mechanically operated.

If the prime mover is a diesel engine, the prevention of further operation will be effected by setting the injector pump delivery to zero.

As has been described above, the temperature of a transmission element may be sensed by sensing the temperature of an enclosure surrounding the transmission element if this is, for some reason, preferred, e.g. if the transmission element is rotary.

I claim:

1. A self-propelled, four-wheel drive vehicle including a prime mover; front and rear sets of driven wheels; transmission means between the prime mover and the driven wheels to transmit drive between the prime mover and the driven wheels, the transmission means comprising a change speed gear box driven by the prime mover, an inter-axle differential driven by said gear box, front and rear driving elements between said differential and said front and rear sets of driven wheels respectively and first control means including a casing with parts rotating therein to control relative rotation between parts of said differential; sensor means to sense the temperature of the first control means and second control means to prevent further operation of the prime mover when said temperature attains a predetermined value.

2. A vehicle according to claim 1 wherein said first control means is a viscous shear coupling.

* * * * *